United States Patent
Yun et al.

(10) Patent No.: US 10,734,670 B2
(45) Date of Patent: Aug. 4, 2020

(54) ANODE FOR LITHIUM SECONDARY BATTERY COMPRISING MESH-SHAPED INSULATING LAYER, AND LITHIUM SECONDARY BATTERY COMPRISING SAME

(71) Applicant: LG CHEM, LTD., Seoul (KR)

(72) Inventors: Hyunwoong Yun, Daejeon (KR); Jonghwa Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 59 days.

(21) Appl. No.: 16/088,603

(22) PCT Filed: Sep. 28, 2017

(86) PCT No.: PCT/KR2017/010784
§ 371 (c)(1),
(2) Date: Sep. 26, 2018

(87) PCT Pub. No.: WO2018/062883
PCT Pub. Date: Apr. 5, 2018

(65) Prior Publication Data
US 2019/0081346 A1    Mar. 14, 2019

(30) Foreign Application Priority Data

Sep. 28, 2016 (KR) .................. 10-2016-0124458
Sep. 27, 2017 (KR) .................. 10-2017-0125228

(51) Int. Cl.
*H01M 10/052* (2010.01)
*H01M 4/36* (2006.01)
(Continued)

(52) U.S. Cl.
CPC ......... *H01M 10/052* (2013.01); *H01M 4/134* (2013.01); *H01M 4/366* (2013.01);
(Continued)

(58) Field of Classification Search
CPC .......... H01M 10/052; H01M 10/4235; H01M 4/134; H01M 4/366; H01M 4/382; H01M 4/405; H01M 4/62
See application file for complete search history.

(56) References Cited

U.S. PATENT DOCUMENTS

2005/0095504 A1    5/2005  Kim et al.
2005/0089759 A1   11/2005  Hwang et al.
(Continued)

FOREIGN PATENT DOCUMENTS

EP    1973188 A1    9/2008
EP    2485300 A1    8/2012
(Continued)

OTHER PUBLICATIONS

Extended European Search Report, dated Mar. 22, 2019, for European Application No. 17856769.9.
(Continued)

*Primary Examiner* — Jayne L Mershon
(74) *Attorney, Agent, or Firm* — Birch, Stewart, Kolasch & Birch, LLP

(57) ABSTRACT

The present invention relates to a negative electrode for a lithium secondary battery including a mesh-type insulating layer, and a lithium secondary battery including the same, and in particular, to a negative electrode for a lithium secondary battery including a mesh-type insulating layer formed on one surface of the lithium metal layer and having pores, and a lithium secondary battery including the same. The lithium secondary battery using the negative electrode induces a lithium dendrite precipitation and removal reaction inside pores of the insulating layer suppressing local lithium metal formation on the lithium metal surface and forming a uniform surface, and cell volume expansion may be suppressed therefrom, and forms a support layer on a passivation layer formed at the beginning preventing
(Continued)

deintercalation and collapse of the passivation layer, and may enhance a battery lifetime by minimizing dead lithium while suppressing additional side reactions with a liquid electrolyte.

6 Claims, 1 Drawing Sheet

(51) Int. Cl.
  *H01M 4/38* (2006.01)
  *H01M 4/62* (2006.01)
  *H01M 4/134* (2010.01)
  *H01M 10/42* (2006.01)
  *H01M 4/40* (2006.01)
  *H01M 4/74* (2006.01)
  *H01M 4/02* (2006.01)

(52) U.S. Cl.
  CPC .......... *H01M 4/382* (2013.01); *H01M 4/405* (2013.01); *H01M 4/62* (2013.01); *H01M 10/4235* (2013.01); *H01M 4/74* (2013.01); *H01M 2004/027* (2013.01); *H01M 2004/028* (2013.01)

(56) References Cited

U.S. PATENT DOCUMENTS

| | | |
|---|---|---|
| 2007/0148549 A1 | 6/2007 | Kobayashi et al. |
| 2008/0274398 A1 | 11/2008 | Kim |
| 2013/0252068 A1 | 9/2013 | Lee et al. |
| 2014/0255780 A1 | 9/2014 | Mikhaylik et al. |
| 2015/0010804 A1 | 1/2015 | Laramie et al. |
| 2015/0017550 A1 | 1/2015 | Nishimura et al. |
| 2015/0295246 A1 | 10/2015 | Son et al. |
| 2015/0325854 A1* | 11/2015 | Kim .................. H01M 4/366 429/231.1 |

FOREIGN PATENT DOCUMENTS

| | | |
|---|---|---|
| EP | 3428998 A1 | 1/2019 |
| KR | 1999-0055229 A | 7/1999 |
| KR | 2003-0042288 A | 5/2003 |
| KR | 10-2005-0041661 A | 5/2005 |
| KR | 10-0477736 B1 | 6/2005 |
| KR | 10-0582558 B1 | 5/2006 |
| KR | 100582558 * | 5/2006 |
| KR | 10-2007-0066942 A | 6/2007 |
| KR | 10-2008-0097771 A | 11/2008 |
| KR | 10-1131555 B1 | 4/2012 |
| KR | 10-1327283 B1 | 11/2013 |
| KR | 10-2014-0058928 A | 5/2014 |
| KR | 10-2014-0137362 A | 12/2014 |
| KR | 10-2015-0030156 A | 3/2015 |
| KR | 10-2016-0025032 A | 3/2016 |
| KR | 10-2016-0033988 A | 3/2016 |
| KR | 10-2016-0034183 A | 3/2016 |
| KR | 10-1625602 B1 | 5/2016 |

OTHER PUBLICATIONS

International Search Report (PCT/ISA/210) issued in PCT/KR2017/010784, dated May 29, 2018.

* cited by examiner

【Figure 1】
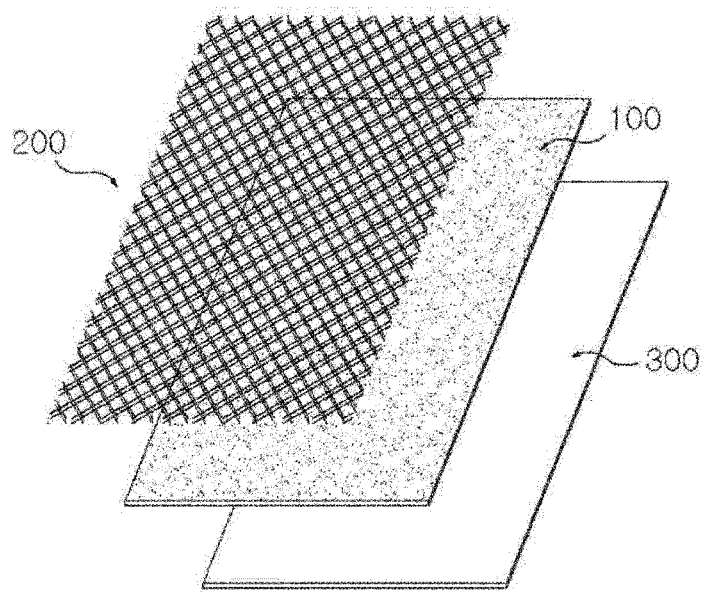
【Figure 2】
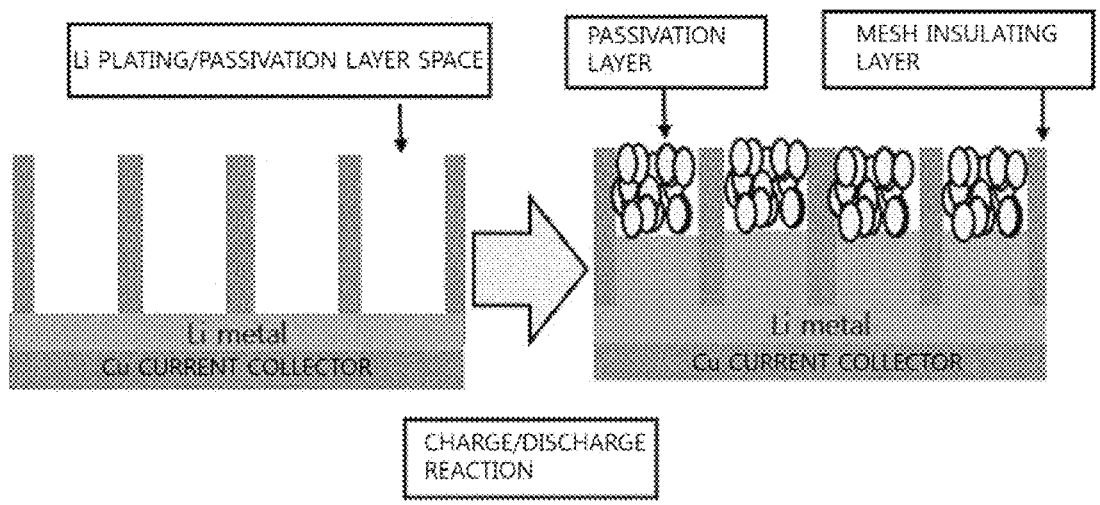

ANODE FOR LITHIUM SECONDARY BATTERY COMPRISING MESH-SHAPED INSULATING LAYER, AND LITHIUM SECONDARY BATTERY COMPRISING SAME

TECHNICAL FIELD

This application claims the benefits of Korean Patent Application No. 10-2016-0124458, filed on Sep. 28, 2016, with the Korean Intellectual Property Office and Korean Patent Application No. 10-2017-0125228, filed on Sep. 27, 2017, with the Korean Intellectual Property Office, the disclosure of which are herein incorporated by reference.

The present invention relates to a negative electrode for a lithium secondary battery including a mesh-type insulating layer, and a lithium secondary battery including the same, and in particular, to a negative electrode for a lithium secondary battery including a mesh-type insulating layer formed on one surface of the lithium metal layer and having pores, and a lithium secondary battery including the same.

BACKGROUND ART

As demands for secondary batteries have increased with the IT mobile market growth, applications of secondary batteries have gradually expanded to electric vehicles and energy storage systems. Particularly, development of next generation lithium batteries having energy density higher than lithium ion batteries (maximum energy density ~250 Wh/kg) is required in order to obtain batteries having high energy density such as batteries for electric vehicles, and one of secondary batteries according with such requirements is a lithium metal battery.

A lithium metal battery is a secondary battery using lithium metal as a negative electrode, and has been researched and developed in various forms such as a lithium-air battery or a lithium-sulfur battery.

Lithium has very low standard reduction potential of −3.045 V SHE (Standard Hydrogen Electrode), has rather high specific gravity of 1.85 $cm^3/g$, and has energy density per weight (3860 mAh/g) of 10 or more times higher than currently commercialized carbon-based negative electrodes (372 mAh/g), and is an ideal material enabling a battery to have high energy density.

However, using lithium metal as a negative electrode of a secondary battery causes problems as follows. First, lithium metal has high reactivity with a liquid electrolyte component forming a passivation layer on the lithium metal surface when bringing the liquid electrolyte into contact with the lithium metal due to spontaneous decomposition of the electrolyte. Such a layer causes deintercalation and collapse of the passivation layer with the progress of continuous charge and discharge cycles of the lithium metal battery, and, as the passivation layer is additionally produced in the gap produced from the phenomenon, causes a problem of degenerating a battery life time property by forming so-called 'dead lithium (dead Li)'. In addition, the passivation layer causes a local current density difference forming dendritic lithium dendrite while non-uniformizing current distribution during charge. In addition, when dendrite formed as above continuously grows breaking through a separator and is brought into contact with a positive electrode, an internal short circuit occurs causing a phenomenon of battery explosion.

Second, lithium is an alkali metal and has high reactivity with moisture, and, even when moisture is included in an electrolyte in a few ppm level, may generate heat and gas by reacting with the moisture causing a problem in battery stability due to internal expansion of a battery. Third, lithium is highly soft and has weak mechanical strength, and handling properties are very poor to use without additional surface treatment. Accordingly, technologies to stabilize a lithium metal electrode and to suppress dendrite formation are core technologies prerequisite to the development of next generation lithium secondary batteries.

In order to resolve such problems, studies such as introducing a polymer protective layer or an inorganic solid protective layer to a lithium metal layer, increasing a concentration of a salt of a liquid electrolyte, or using proper additives have been progressed currently. However, effects of lithium dendrite suppression of such studies are insignificant. Accordingly, modifying a form of a lithium metal negative electrode itself or modifying a structure of a battery may become an effective alternative in resolving the problems.

PRIOR ART DOCUMENTS

Patent Documents

Korean Patent Application Publication No. 2015-0030156 "Lithium electrode and lithium secondary battery including the same"

DISCLOSURE

Technical Problem

As described above, lithium dendrite of a lithium secondary battery is precipitated on a negative electrode current collector surface and sometimes causes cell volume expansion therefrom. In addition, a passivation layer formed on an electrode of a lithium secondary battery has a problem of degrading a battery life time property by deintercalation and collapse of the passivation layer as a charge and discharge process is progressed. As a result of extensive studies in view of the above, the inventors of the present invention have found out a way to resolve such a problem caused by dendrite and passivation layer through modifying a form and a structure of an electrode itself, and have completed the present invention.

Accordingly, an aspect of the present invention provides a lithium secondary battery resolving a problem of cell volume expansion caused by lithium dendrite and a problem caused by deintercalation and collapse of a passivation layer through modifying a form and a structure of an electrode, and thereby having enhanced performance.

Technical Solution

According to an aspect of the present invention, there is provided a negative electrode for a lithium secondary battery including a lithium metal layer; a mesh-type insulating layer formed on one surface of the lithium metal layer and having pores; and a negative electrode current collector formed on the other surface of the lithium metal layer.

According to another aspect of the present invention, there is provided a lithium secondary battery including the negative electrode.

Advantageous Effects

A lithium secondary battery using a negative electrode according to the present invention induces a lithium dendrite precipitation and removal reaction inside pores of the insulating layer suppressing local lithium metal formation on the lithium metal surface and forming a uniform surface, and cell volume expansion can be suppressed therefrom.

In addition, by introducing an insulating layer having pores in an electrode, a lithium secondary battery using a negative electrode according to the present invention forms a support layer of a passivation layer formed at the beginning of a charge and discharge process and thereby prevents deintercalation and collapse of the passivation layer, and as a result, is capable of enhancing a battery life time property by minimizing dead lithium while suppressing additional side reactions with a liquid electrolyte.

DESCRIPTION OF DRAWINGS

FIG. 1 is a perspective view of a negative electrode for a lithium secondary battery including a mesh-type insulating layer according to one embodiment of the present invention.

FIG. 2 is a mimetic diagram of an insulating layer-introduced negative electrode according to the present invention.

BEST MODE

Hereinafter, the present invention will be described in detail with reference to accompanying drawings so that those skilled in the art may readily implement the present invention. However, the present invention may be implemented in various different forms, and is not limited to the present specification.

FIG. 1 is a perspective view of a negative electrode for a lithium secondary battery including a mesh-type insulating layer according to one embodiment of the present invention. One embodiment of the present invention provides a negative electrode for a lithium secondary battery including a lithium metal layer (100); a mesh-type insulating layer (200) formed on one surface of the lithium metal layer (100) and having pores; and a negative electrode current collector (300) formed on the other surface of the lithium metal layer (100).

Preferably, the insulating layer (200) has a mesh (network) form, and herein, a lithium metal precipitation and removal reaction occurs in the formed pores to suppress local lithium dendrite formation on the surface of the lithium metal layer (100). In addition, the insulating layer (200) forms a support layer on a passivation layer formed at the beginning of a charge and discharge process of a lithium secondary battery, and thereby prevents deintercalation and collapse of the passivation layer and suppresses additional side reactions with a liquid electrolyte, and minimizes dead lithium as well, and as a result, is capable of enhancing a battery life time property.

Herein, the insulating layer may have a pore size of 100 nm to 500 µm, and preferably 1 µm to 100 µm.

When the pore size is less than the above-mentioned range, the pore sizes are too small reducing lithium ion conductivity, which causes a problem of battery performance decline, and when the pore size is greater than the above-mentioned range, the function as an insulating layer is lost and an effect of enhancing a life time property may not be obtained, and therefore, the pore size is properly controlled in the above-mentioned range.

The percentage of the pores in the insulating layer (200) is preferably from 20% to 80% as an aperture ratio, a percentage of the area occupied by the pore region based on 100% of the whole insulating layer (200) area. When the aperture ratio is less than 20%, an effect of inducing a lithium dendrite precipitation and removal reaction, a goal of the present invention, may not be secured, and when the aperture ratio is greater than 80%, an area of contact between the insulating layer (200) and the lithium metal layer (100) relatively decreases declining battery performance.

The insulating layer (200) is preferably formed with an insulating material that does not have electron conductivity and lithium ion conductivity. For example, the material may be selected from among carboxymethyl cellulose (CMC), nylon, polyacrylic acid (PAA), polyvinyl alcohol (PVA), polyacetic acid (PLA), polyethylene-co-vinyl acetate, PEVA/PLA, polymethacrylate (PMMA)/tetrahydroperfluorooctyl acrylate (TAN), polyethylene oxide (PEO), polymethacrylate (PMMA), polyamide (PA), polycaprolactone (PCL), polyethylimide (PEI), polycaprorlactam, polyethylene (PE), polyethylene terephthalate (PET), polyolefin, polyphenyl ether (PPE), polyvinyl chloride (PVC), polyvinylidene chloride (PVDC), polyvinylidene fluoride (PVDF), poly(vinylidene fluoride-co-hexafluoropropylene) (PVDF-HFP), polyvinyl-pyridine, polylactic acid (PLA), polypropylene (PP), polybutylene (PB), polybutylene terephthalate (PBT), polyamide (PA), polyimide (PI), polycarbonate (PC), polytetrafluoroethylene (PTFE), polystyrene (PS), polyester (PE), acrylonitrile butadiene styrene (ABS), poly(methyl methacrylate) (PMMA), polyoxymethylene (POM), polysulfone (PES), styrene-acrylonitrile (SAN), polyacrylonitrile (PAN), styrene-butadiene rubber (SBR), ethylene vinyl acetate (EVA), styrene maleic anhydride (SMA), vinyl, germanium, silicon, silica, alumina, magnesia, selenium and combinations thereof, but is not limited thereto.

The insulating layer (200) being thinner is advantageous for a battery output property, however, a lithium dendrite precipitation and removal reaction may be suppressed when the insulating layer is formed to a certain thickness or higher. Considering the significance of improving effects obtained by such insulating layer (200) formation, the thickness is preferably from 0.01 µm to 50 µm.

The negative electrode current collector (300) according to the present invention is not particularly limited as long as it has high conductivity without inducing chemical changes to a battery, and examples thereof may include any one metal selected from the group consisting of copper, aluminum, stainless steel, zinc, titanium, silver, palladium, nickel, iron, chromium, alloys thereof and combinations thereof. The stainless steel may have its surface treated with carbon, nickel, titanium or silver, and aluminum-cadmium alloys may be used as the alloy, and in addition thereto, baked carbon, nonconductive polymers of which surface is treated with a conductive material, conductive polymers or the like may also be used. A copper thin plate is generally used as the negative electrode current collector.

As the negative electrode current collector (300), those generally having a thickness range of 3 µm to 500 µm are used. When the negative electrode current collector (300) has a thickness of less than 3 µm, a current collecting effect decreases, and the thickness being greater than 500 µm has a problem of processability decline when assembling a cell through folding.

Another embodiment of the present invention provides a negative electrode for a lithium secondary battery including a lithium metal layer (100) including a lithium-containing metal compound including Li, and an element selected from the group consisting of S, P, O, Cl, Se, F, Br, I and combinations thereof; a mesh-type insulating layer (200) formed on one surface of the lithium metal layer (100) and having pores; and a negative electrode current collector (300) formed on the other surface of the lithium metal layer (100).

The lithium metal layer (100) may be a lithium-containing metal compound including lithium, and an element selected from the group consisting of S, P, O, Cl, Se, F, Br, I and combinations thereof. In addition thereto, elements selected from the group consisting of Ni, Co, Cu, Zn, Ga, Ge, Si, Al, Fe, V, Mn, Ti, Mo, Cr, Nb, Pt and combinations thereof may be further included.

In the lithium-containing metal compound, a sum of the added amounts of atoms other than lithium is preferably from 5% by weight to 20% by weight with respect to the total weight of the negative electrode active material. The method of combination is not limited, and a method of alloying in the corresponding mixing ratio may be used, or forming a film on the negative electrode current collector (300) in a metal powder form may also be used.

Such a lithium-containing metal compound is added to supplement irreversible capacity of lithium metal, and may be added in an amount corresponding to theoretical capacity of a positive electrode active material to be described later, or may be added in excess, and such an excess negative electrode active material may prevent lithium dendrite from being precipitated on the lithium metal surface.

The electrode for a lithium secondary battery according to the present invention may be prepared using various preparation methods, and may be prepared using the following embodiment.

According to one embodiment, a lithium metal layer (100) is prepared, then a mesh-type insulating layer (200) is placed on one surface of the lithium metal layer (100), and then the result is rolled to prepare the electrode. Herein, the rolling may be carried out through a method of applying external force such as two or more rolling rolls rotating while facing each other. The rolling is preferably carried out under a temperature and a pressure capable of maximally exhibiting binding strength by the pressing of the insulating layer (200) on the lithium metal layer (100).

According to another embodiment, a lithium metal layer (100) is prepared, and then a mesh-type insulating layer (200) having pores may be patterning deposited on the lithium metal layer (100) through electrospinning to prepare the electrode. Specifically, a spinning solution is prepared using a material of the insulating layer (200) not having electron conductivity and lithium ion conductivity described above, and the spinning solution is shot on one surface of the lithium metal layer (100). When preparing an insulating layer (200) using such a preparation method, thicknesses of a spinning fiber and a sheet need to be controlled so as to obtain mesh-type pores.

A solvent used in the spinning solution may include any solvent capable of dissolving one or more polymer components. For example, ethanol, methanol, propanol, butanol, isopropyl alcohol (IPA), dimethylformamide (DMF), acetone, tetrahydrofuran (THF), toluene, N-methyl pyrrolidone (NMP), dimethylacetamide (DMAC) and the like may be used. The solvent is used matching hydrophilicity or hydrophobicity of polymer materials, and with polymers having hydrophilicity, distilled water ($H_2O$) may also be used as well as organic solvents. The solvent may be included in 70% by weight to 99.5% by weight with respect to the total weight of the spinning solution.

In the lithium secondary battery according to the present invention, constitutions other than structures and characteristics of the negative electrode described above may be prepared through known technologies implemented by those skilled in the art, and hereinafter, specific descriptions will be provided.

The positive electrode according to the present invention may be prepared into a positive electrode form by filming a composition including a positive electrode active material, a conductive material and a binder on a positive electrode current collector.

As the positive electrode active material, any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}CoyO_2$, $LiCl_{1-y}MnyO_2$, $LiNi_{1-y}MnyO_2$ ($0\leq y<1$), $Li(Ni_aCo_bMn_c)O_4$ ($0<a<2$, $0<b<2$, $0<c<2$, $a+b+c=2$), $LiMn_{2-z}NizO_4$, $LiMn_{2-z}CozO_4$ ($0<z<2$), $LiCoPO_4$ and $LiFePO_4$, or a mixture of two or more types thereof may be used. In addition, sulfides, selenides, halides and the like may also be used in addition to such oxides. In more preferred examples, the positive electrode active material may be $LiNi_{0.8}Co_{0.15}Al_{0.05}O_2$ suited for high output batteries.

The conductive material is a component for further enhancing conductivity of a positive electrode active material, and nonlimiting examples thereof may include graphite such as natural graphite or artificial graphite; carbon black such as Super-P, Super-C, carbon black, acetylene black, ketjen black, channel black, furnace black, lamp black and thermal black; conductive polymers such as carbon fibers or metal fibers; fluorocarbon, aluminum and metal powders such as nickel powder; conductive whiskers such as zinc oxide and potassium titanate; conductive metal oxides such as titanium oxide; conductive materials such as polyphenylene derivatives, and the like.

The binder has functions of keeping a positive electrode active material on a positive electrode current collector, and organically linking the positive electrode active materials, and examples thereof may include polyvinylidene fluoride (PVDF), polyvinyl alcohol (PVA), carboxymethylcellulose (CMC), starch, hydroxypropylcellulose, regenerated cellulose, polyvinyl pyrrolidone, tetrafluoroethylene, polyethylene, polypropylene, an ethylene-propylene-diene polymer (EPDM), a sulfonated-EPDM, styrene-butadiene rubber, fluoro rubber, various copolymers thereof, and the like.

The positive electrode current collector is the same as described in the negative electrode current collector, and an aluminum thin plate may be generally used as the positive electrode current collector.

The separator according to the present invention is not particularly limited in the material and, as a material physically separating a positive electrode and a negative electrode and having electrolyte and ion penetrability, those commonly used as a separator in an electrochemical device may be used without particular limit. However, as a material that is porous, nonconductive and insulating, those having an excellent liquid electrolyte moisture-containing ability while having low resistance for ion migration of the liquid electrolyte are particularly preferred. For example, a polyolefin-based porous membrane or a non-woven fabric may be used, however, the separator is not particularly limited thereto.

As examples of the polyolefin-based porous membrane, membranes formed with a polymer using a polyolefin-based polymer such as polyethylene such as high density polyethylene, linear low density polyethylene, low density polyethylene and ultra-high molecular weight polyethylene, polypropylene, polybutylene and polypentene alone, or formed with a polymer mixing these may be used.

As the non-woven fabric other than the polyolefin-based non-woven fabric described above, a non-woven fabric formed with a polymer using, for example, polyphenylene oxide, polyimide, polyamide, polycarbonate, polyethylene terephthalate, polyethylene naphthalate, polybutylene terephthalate, polyphenylene sulfide, polyacetal, polyether sulfone, polyetheretherketone, polyester and the like alone, or formed with a polymer mixing these may be used, and, as a fiber form forming a porous web, such a non-woven fabric includes a spunbond or meltblown form formed with long fibers.

The thickness of the separator is not particularly limited, but is preferably in a range of 1 μm to 100 μm, and more preferably in a range of 5 μm to 50 μm. When the separator has a thickness of less than 1 μm, mechanical properties may not be maintained, and when the thickness is greater than 100 μm, the separator functions as a resistive layer declining battery performance.

A pore size and porosity of the separator are not particularly limited, however, the pore size is preferably from 0.1 μm to 50 μm, and the porosity is preferably from 10% to 95%. When the separator has a pore size of less than 0.1 μm or porosity of less than 10%, the separator functions as a resistive layer, and when the pore size is greater than μm or the porosity is greater than 95%, mechanical properties may not be maintained.

The electrolyte capable of being used in the present invention may be a liquid non-aqueous electrolyte, or a polymer electrolyte such as a solid electrolyte or a gel electrolyte. In the former, the non-aqueous electrolyte battery is formed as a so-called lithium ion secondary battery, and in the latter, the non-aqueous electrolyte battery is formed as a polymer electrolyte battery such as a polymer solid electrolyte battery or a polymer gel electrolyte battery.

The electrolyte salt included in the non-aqueous liquid electrolyte is a lithium salt. As the lithium salt, those commonly used in liquid electrolytes for a lithium secondary battery may be used without limit. For example, an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, or two or more types thereof.

The concentration of the lithium salt included in the non-aqueous liquid electrolyte is preferably from 0.1 mol/L to 5 mol/L and more preferably from 0.5 mol/L to 3.0 mol/L.

As the organic solvent included in the non-aqueous liquid electrolyte, those commonly used in liquid electrolytes for a lithium secondary battery may be used without limit, and for example, ether, ester, amide, linear carbonate, cyclic carbonate and the like may be used either alone or as a mixture of two or more types. Among these, a carbonate compound that is cyclic carbonate, linear carbonate or a mixture thereof may be typically included.

Specific examples of the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate and halides thereof, or a mixture of two or more types thereof. Examples of the halides thereof may include fluoroethylene carbonate (FEC) and the like, but are not limited thereto.

Specific examples of the linear carbonate compound may typically include any one selected from the group consisting of dimethyl carbonate (DMC), diethyl carbonate (DEC), dipropyl carbonate (DPC), ethylmethyl carbonate (EMC), methylpropyl carbonate (MPC) and ethylpropyl carbonate (EPC), or a mixture of two or more types thereof, but are not limited thereto.

Particularly, among the carbonate-based organic solvents, ethylene carbonate and propylene carbonate that are cyclic carbonate are a highly viscous organic solvent and have a high dielectric constant, and therefore, may more favorably dissociate a lithium salt in an electrolyte, and when mixing and using linear carbonate having low viscosity and low dielectric constant such as dimethyl carbonate and diethyl carbonate in a proper ratio to such cyclic carbonate, a liquid electrolyte having higher electrical conductivity may be prepared.

In addition, as the ether among the organic solvents, any one selected from the group consisting of dimethyl ether, diethyl ether, dipropyl ether, methylethyl ether, methylpropyl ether and ethylpropyl ether, or a mixture of two or more types thereof may be used, however, the ether is not limited thereto.

As the ester among the organic solvents, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more types thereof may be used, however, the ester is not limited thereto.

The non-aqueous liquid electrolyte may be injected at a proper stage in an electrochemical device manufacturing process depending on manufacturing process and required properties of a final product. In other words, the non-aqueous liquid electrolyte may be injected at a stage prior to assembling an electrochemical device or at a final stage of electrochemical device assembly.

The lithium secondary battery according to the present invention may go through lamination (stack) and folding processes of a separator and an electrode in addition to winding, a general process. In addition, the battery case may be a cylinder-type, a square-type, a pouch-type, a coin-type or the like.

As described above, the lithium secondary battery according to the present invention stably exhibits excellent discharge capacity, output property and capacity retention rate, and therefore, is useful in the fields of portable devices such as mobile phones, notebook computers or digital cameras, electric vehicles such as hybrid electric vehicles (HEV), and the like.

According to another embodiment of the present invention, there is provided a battery module including the lithium secondary battery as a unit cell, and a battery pack including the same. The battery module or the battery pack may be used as a power supply of any one or more medium to large-sized devices such as power tools; electric vehicles including electric vehicles (EV), hybrid electric vehicles (HEV) and plug-in hybrid electric vehicles (PHEV); or systems for power storage.

MODE FOR INVENTION

Hereinafter, examples, comparative examples and experimental examples are described in order to illuminate effects of the present invention. However, the following descriptions are just one examples of contents and effects of the present invention, and the scope of a right and effects of the present invention are not limited thereto.

EXAMPLE

Example 1—Manufacture of Lithium Secondary Battery

A lithium secondary battery was manufactured using a lithium metal negative electrode, an organic liquid electrolyte and an NCM positive electrode. In order to prepare the positive electrode, poly(vinylidene fluoride) (PVdF) used as a binder was dissolved in N-methyl pyrrolidone, then Super-P carbon, a conductive material, and $LiNi_{0.8}Co_{0.15}Al_{0.05}O_2$, an active material, were quantized and introduced thereto, and the result was stirred. Herein, the positive electrode active material, the conductive material and the binder had a weight ratio of 85:7.5:7.5. After coating the completely mixed slurry solution on an aluminum current collector, and drying the result, a lamination process was carried out using a roll press. This is for enhancing mutual binding strength of the active material/conductive material/binder, and effectively binding these materials on the current collector. After the pressing process, a proper-sized electrode was prepared through a cutting process, and the electrode was dried for 24 hours or longer in a vacuum oven at 110° C.

As the negative electrode, an insulating layer made of alumina having 1 μm mesh pores was placed on one surface of lithium metal, and after pressing the result using a rolling roll, copper foil was placed on the other surface of the insulating layer-introduced lithium metal as a current collector, and the result was laminated.

The liquid electrolyte was obtained by dissolving 0.5 wt % of 1 M $LiPF_6$ in a mixed solvent of ethylene carbonate/ ethylmethyl carbonate/dimethyl carbonate (volume ratio 1:1:1), and polyethylene (PE) was used as a separator to manufacture a coin cell. Both electrodes were prepared in a dry room, and the battery was manufactured in a glove box where argon atmosphere was maintained.

Example 2

A lithium secondary battery was manufactured in the same manner as in Example 1 except that an insulating layer having 20 μm mesh pores is used.

Example 3

A lithium secondary battery was manufactured in the same manner as in Example 1 except that an insulating layer having 40 μm mesh pores is used.

Example 4

A lithium secondary battery was manufactured in the same manner as in Example 1 except that an insulating layer having 60 μm mesh pores is used.

Example 5

A lithium secondary battery was manufactured in the same manner as in Example 1 except that an insulating layer having 80 μm mesh pores is used.

Example 6

A lithium secondary battery was manufactured in the same manner as in Example 1 except that an insulating layer having 100 μm mesh pores is used.

Example 7

A lithium secondary battery was manufactured in the same manner as in Example 1 except that an insulating layer having 150 μm mesh pores is used.

Example 8

A lithium secondary battery was manufactured in the same manner as in Example 1 except that an insulating layer having 200 μm mesh pores is used.

Example 9

A lithium secondary battery was manufactured in the same manner as in Example 1 except that an insulating layer having 300 μm mesh pores is used.

Example 10

A lithium secondary battery was manufactured in the same manner as in Example 1 except that an insulating layer having 500 μm mesh pores is used.

Comparative Example 1

A lithium secondary battery was manufactured in the same manner as in Example 1 except that an insulating layer having 1 mm mesh pores is used.

Comparative Example 2

A lithium-sulfur battery was manufactured in the same manner as in Example 1 except that an insulating layer was not introduced to the negative electrode of the battery.

Experimental Example 1

Each of the lithium-sulfur batteries manufactured in the examples and the comparative examples was operated under a 0.3 C/0.5 C charge/discharge condition. Initial charge and discharge capacity was measured, and changes in the capacity after 200 cycles were identified. The results are shown in the following Table 1.

TABLE 1

|  | Obtained Capacity of $1^{st}$ Cycle (mAh) | Capacity Retention Rate (%) (200 Cycles) |
|---|---|---|
| Example 1 | 5.25 | 84.57 |
| Example 2 | 5.24 | 85.65 |
| Example 3 | 5.26 | 89.15 |
| Example 4 | 5.28 | 86.57 |
| Example 5 | 5.24 | 83.56 |
| Example 6 | 5.24 | 80.15 |
| Example 7 | 5.27 | 70.54 |
| Example 8 | 5.29 | 60.78 |
| Example 9 | 5.21 | 50.23 |
| Example 10 | 5.24 | 40.46 |
| Comparative Example 1 | 5.23 | 25.35 |
| Comparative Example 2 | 5.21 | 20.57 |

From such results, it was identified that obtained capacity of the first charge and discharge cycle of the batteries are similar due to the introduction of the insulating layer provided in the present invention, whereas Examples 7 to 10 and Comparative Example 1 having an insulating layer pore size of 150 μm or greater, and Comparative Example 2 with no insulating layer introduction had significantly reduced battery capacity retention rates, and it was seen that, when operating a lithium secondary battery, an excellent life time property may be secured due to the insulating layer provided in the present invention.

REFERENCE NUMERAL

100: Lithium Metal Layer
200: Insulating Layer
300: Negative Electrode Current Collector

The invention claimed is:

1. A negative electrode for a lithium secondary battery comprising:
 a lithium metal layer;
 a mesh-type insulating layer formed on one surface of the lithium metal layer and having pores,
 wherein the insulating layer has a pore size of 1 μm to 100 μm; and
 a negative electrode current collector formed on the other surface of the lithium metal layer.

2. The negative electrode for a lithium secondary battery of claim 1, wherein a material of the insulating layer is one or more types selected from the group consisting of carboxymethyl cellulose (CMC), nylon, polyacrylic acid (PAA), polyvinyl alcohol (PVA), polyacetic acid (PLA), polyethylene-co-vinyl acetate, PEVA/PLA, polymethacrylate (PMMA)/tetrahydroperfluorooctyl acrylate (TAN), polyethylene oxide (PEO), polymethacrylate (PMMA), polyamide (PA), polycaprorlactone (PCL), polyethylimide (PEI), polycaprorlactam, polyethylene (PE), polyethylene terephthalate (PET), polyolefin, polyphenyl ether (PPE), polyvinyl chloride (PVC), polyvinylidene chloride (PVDC), polyvinylidene fluoride (PVDF), poly(vinylidenefluoride-co-hexafluoropropylene) (PVDF-HFP), polyvinyl-pyridine, polylactic acid (PLA), polypropylene (PP), polybutylene (PB), polybutylene terephthalate (PBT), polyamide (PA), polyimide (PI), polycarbonate (PC), polytetrafluoroethylene (PTFE), polystyrene (PS), polyester (PE), acrylonitrile butadiene styrene (ABS), poly(methyl methacrylate) (PMMA), polyoxymethylene (POM), polysulfone (PES), styrene-acrylonitrile (SAN), polyacrylonitrile (PAN), styrene-butadiene rubber (SBR), ethylene vinyl acetate (EVA), styrene maleic anhydride (SMA), vinyl, germanium, silicon, silica, alumina, magnesia, selenium and combinations thereof.

3. A lithium secondary battery comprising:
 a negative electrode;
 a positive electrode; and
 an electrolyte provided therebetween,
 wherein the negative electrode is the negative electrode of claim 1.

4. The negative electrode for a lithium secondary battery of claim 1, wherein the lithium metal layer comprises a lithium-containing metal compound including Li and an element selected from the group consisting of S, P, O, Cl, Se, F, Br, I and combinations thereof.

5. The negative electrode for a lithium secondary battery of claim 1, wherein the insulating layer has a pore size of 1 μm to 80 μm.

6. The negative electrode for a lithium secondary battery of claim 1, wherein the insulating layer has a pore size of 1 μm to 40 μm.

* * * * *